United States Patent

[11] 3,583,441

| [72] | Inventors | Leo E. Grant<br>Anaheim;<br>Benjamin T. Howland, Long Beach, both of, Calif. |
|---|---|---|
| [21] | Appl. No. | 789,779 |
| [22] | Filed | Jan. 8, 1969 |
| [45] | Patented | June 8, 1971 |
| [73] | Assignee | North American Rockwell Corporation |

[54] VALVE
4 Claims, 2 Drawing Figs.

[52] U.S. Cl. ............................................. 137/625.48,
251/333, 251/360
[51] Int. Cl. .................................................. F16k 1/34
[50] Field of Search ............................................. 251/333,
332, 334, 360; 137/625.48, 610

[56] References Cited
UNITED STATES PATENTS

| 1,171,120 | 2/1916 | Hatz | 251/360X |
| 1,520,694 | 12/1924 | Butler et al. | 251/360X |
| 1,656,375 | 1/1928 | Harris | 251/360X |
| 2,173,064 | 9/1939 | Judell | 4/187 |
| 2,230,806 | 2/1941 | Lohmolder | 251/360X |
| 2,403,777 | 7/1946 | Yanka | 251/333X |

FOREIGN PATENTS

| 649,654 | 10/1962 | Canada | 251/333 |
| 840,442 | 1/1939 | France | 251/332 |

*Primary Examiner*—M. Cary Nelson
*Assistant Examiner*—Michael O. Sturm
*Attorneys*—William R. Lane, Allan Rothenberg and Richard D. Seibel

ABSTRACT: A readily manufactured highly versatile stock valve is described employing a standard flare fitting in the dual function of both an inlet port and a valve seat.

PATENTED JUN 8 1971 3,583,441

INVENTORS.
LEO E. GRANT
BENJAMIN T. HOWLAND
BY Richard D. Seibel
ATTORNEY

VALVE

BACKGROUND

In order to produce valves economically, simple manufacturing techniques are required. It is also desirable for economy to provide versatility so a single valve design may be employed for a number of varying purposes. It is also desirable to provide a valve with ready interchangeability of components for maximum flexibility. It is also desirable that the components of the valve most subject to damage or wear be readily replaceable.

SUMMARY OF THE INVENTION

Therefore, in the practice of this invention according to a preferred embodiment, there is provided a valve body in combination with a standard flare fitting wherein the sealing of the valve is against the standard flare fitting so that it serves the dual function of providing a fluid conduit and a valve seat. The valve body is free of enlarged internal cavities for manufacturing ease and economy.

DRAWINGS

Figure 1:
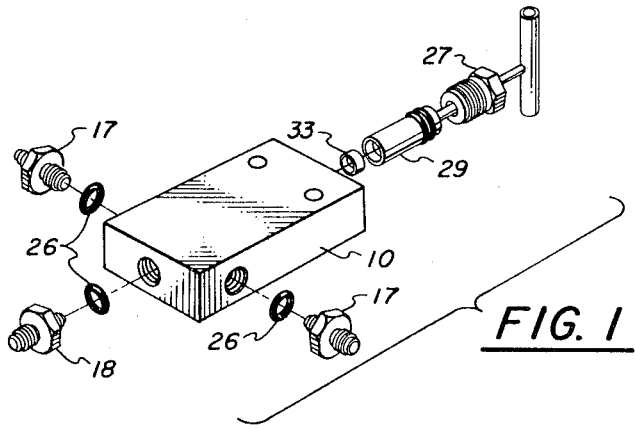

Objects and many of the attendant advantages of this invention will be appreciated as the same becomes better understood by reference to the following detailed description when considered in connection with the accompanying drawings wherein:

FIG. 1 presents an exploded view of the valve; and

Figure 2:
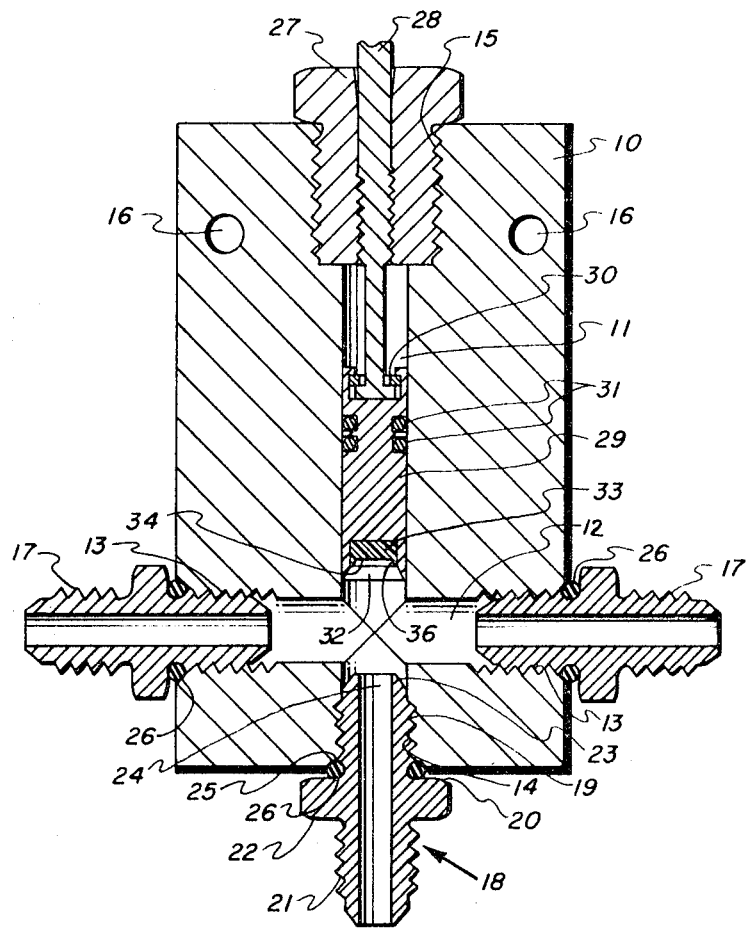

FIG. 2 illustrates a cross section of the assembled valve.

Throughout the drawings like reference numerals refer to like parts.

DESCRIPTION

FIGS. 1 and 2 illustrate a stock valve incorporating the principles of this invention. As illustrated in this embodiment there is provided a valve body 10 which is simply a rectangular block of metal such as stainless steel cut from standard wrought bar stock. By employing a simple design for the valve body, small size stainless steel valves can be made from bar stock without the complexity of castings involving complex cores and final machining operations. Within the body of the valve a first cylindrical bore 11 is drilled through the longest dimension of the block 10. This is intersected by a cylindrical crossbore 12 through the valve body with the two bores 11 and 12 being of substantially the same diameter and collectively defining an internal cavity in the valve body of the same size as the bores, that is, not enlarged by internal boring. Since the two drilled bores are fairly large, precise intersection in the drilling operation is not required for the valve to operate satisfactorily.

A tapped portion 13 is provided at each end of the crossbore 12 and a similar tapped portion 14 is provided at the end of the bore 11 at the shorter end thereof. At the opposite end of the bore 11 and internally threaded counterbore 15 is provided. A pair of mounting holes 16 in or through the valve body 10 may be employed for mounting the valve to some additional structure (not shown).

Threaded into the tapped portions 13 and 14 are standard flare fitting unions 17 and 18, respectively. The unions 17 and 18 are standard commercial items employed for making connections to flared tubing and are available in many materials and quality standards. The standard flare fitting union 18 has a threaded portion 19 which in this embodiment is employed for connection to the valve body, and a second threaded portion 21 at the opposite end thereof for connection to a conventional flare fitting nut (not shown). Other tube fitting ends 21 on the union may be employed if desired, such as compression fittings, pipe fittings and the like. Between the two threaded portions 19 and 21 an intermediate tool receiving hexagonal flange portion 22 is provided for accepting a wrench for making firm connections. The face 20 on the flange portion 22 is flat and normal to the axis of the union. Each of the unions 17 and 18 is sealed to the valve body by an O-ring 26 bearing against the flat surface 20 of the flange portion 22 on the union. A slight chamber 25 at the outer ends of the tapped holes 13 and 14 helps trap the O-rings and prevent blowout thereof when the valve is employed at high pressures. In conventional application of the standard flare unions, sealing is against the end of the union and directly to tubing. O-rings are not conventionally employed with flare fittings.

At the end of the threaded portion 19 on the standard flare fitting, a conical surface 23 is provided which, in the usual application of the union, fits against the flared end of a piece of tubing. An axial passage 24 through the union provides for fluid flow into the valve and in the usual application of the union communicates with the interior of two pieces of tubing. The standard flare fitting has a conical surface 23 having a half angle of 37°. Since the axis of the conical surface 23 is coincident with the axis of the bore 24, they intersect in a circular edge portion. The cross bore 12 is far enough from the end of the valve that the end of the flare union is completely within the bore 11, that is, it does not project into the crossbore 12, which assures unobstructed fluid flow when the valve is open.

An internally and externally threaded plug 27 is threaded into the plug 27 for operating the valve. A poppet 29 is mounted on the valve stem 28 by a snap ring 31 so that the poppet is free to move in the bore 11 without rotating with the valve stem 28. A pair of O-rings 31 on the outer periphery of the poppet 29 seal against the bore 11 to prevent leakage around the valve stem. It will be recognized that a single O-ring is sufficient for sealing in these circumstances and the second O-ring is merely redundant for enhanced reliability in case of damage to one of the O-rings.

At the opposite end of the poppet 29 from the valve stem 28 there is provided a conical recess 32 having a half angle of 37° to mate with the corresponding conical surface 23 on the standard flare fitting union 18. The conical surface 32 provides substantial sealing against the conical surface 23 on the standard flare fitting as a metal to metal seal for accommodating high pressures. Standard flare fittings are available in a broad variety of materials including stainless steel, brass, and aluminum and good metal to metal seals can be obtained with any of these materials. It is preferred that the poppet 29 be made of a material that is slightly harder than the material employed in the standard flared tube fitting. This helps assure that any damage occurring to one of the valve seats is most likely on the softer material of the readily replaceable standard flare fitting. By so providing a ready supply of replacement parts it is conveniently available since the standard flare fittings are widely used and stocked. Any damaged valve seats can thus be quickly and economically replaced if necessary.

A resiliently deformable insert 33 is provided in the poppet 28 toward the apex end of the conical recess 32. The insert 33 has a central flat portion 34 for engaging the circular edge portion of the standard flare fitting 18 where the conical surface 23 and the axial passage 24 intersect. The insert also has a slight lip 36 which has an internal conical surface which is substantially a continuation of the internal conical surface 32 on the poppet except that the conical surface on the lip 36 is raised two or three mils above the conical surface 32 so that positive engagement with the male cone 23 on the standard flare fitting is obtained. Thus in addition to the metal to metal seal between the conical recess 32 in the poppet and the conical end 23 on the standard flare fitting there is also a soft resilient seal against a small surface portion of the cone 23 and against the circular end portion of the standard flare fitting to prevent any minor leakages through the metal to metal seal. The engagement of the two metal cones accommodates the principal pressure on the valve seat and also limits the travel of the poppet so that damage to the soft insert 33 is prevented.

The insert 33 and the O-rings 26 and 31 are preferably made of a material satisfactory for use at cryogenic temperatures so that maximum versatility is provided in use of the valve. Thus, for example, the insert and O-rings can be made of conventional rubberlike materials or of resilient plastics such as nylon, polytrifluorochloroethylene (Kel–F) or polytetrafluoroethylene (Teflon).

It is noted that a large, unobstructed internal cavity is provided in the valve body by the intersecting bores 11 and 12 for maximum fluid flow without any necessity of machining an enlarged cavity. Thus simple drilled bores are satisfactory. Full flow in the valve is assured by making the depth of the tapped portions 13 and 14 sufficient that the ends of the standard flare fittings do not obstruct the internal cavity. The valve body adjacent the stem is also made sufficiently long that the poppet in the bore 11 can be withdrawn completely out of the crossbore 12 when the valve is completely open. It should also be noted that the double conical sealing arrangement provides a good degree of flow control when the valve is nearly closed in somewhat the same manner, but without as great precision, as a needle valve.

It will be apparent to one skilled in the art that many modifications and variations can be made in valves incorporating the principles of this invention. Thus, for example, other means for stroking the valve stem may be provided other than the threaded fitting such as lever actions and the like. The stem and valve top can also be made longer and more slender so that heat condition is minimized and the stem can be kept free of icing when used for cryogenic fluids. The standard flare unions employed for connection to the valve body have been described and illustrated with standard flare fittings at both ends thereof. It will be apparent, however, that the connections to external conduits or other hardward can be by way of standard compression fittings, pipe threads, or the like, as desired. It should also be apparent that instead of providing two outlets from the valve, one of the apertures 13 in the crossbore 12 may be plugged in some applications so that the valve is employed as an angle valve instead of the T configuration illustrated.

A stainless steel, ⅜-inch valve constructed according to the principles of this invention has been operated safely at 15,000 p.s.i. without leakage at the valve stem or through the valve seat. Such a valve has also been employed at the temperature of liquid nitrogen and it was noted that no ice formed at the stem end of the valve for about 10 to 15 minutes without any attempt to provide auxiliary heating. The valve operated freely and smoothly at the cryogenic temperature and repeatedly made leak proof closures.

What we claim is:

1. A full flow valve comprising:
   a valve body;
   a first cylindrical bore extending through the valve body;
   a second cylindrical bore in the valve body, said second bore communicating with said first bore to form a cavity within the valve body;
   a valve stem movably mounted within said first bore and extending out of one end of said first bore;
   a fluid seal between said poppet and said valve body;
   a standard flare tube fitting removably fitted in the other end of said first bore from the outside of said valve body, said fitting including a fluid conduit therethrough, a male conical seating surface coaxial with the fluid conduit and extending into said first bore towards said poppet, and a circular edge portion at the intersection of the fluid conduit and the male conical seating surface;
   a female conical seating surface on said poppet and opposed to the male conical seating surface for sealing therebetween;
   a resiliently deformable insert in said poppet the smaller end of the female conical seating surface and opposed to the circular edge portion for sealing thereagainst so that dual sealing is obtained between said poppet and said fitting;
   said insert comprising a peripheral lip having a female conical seating surface slightly raised from the conical surface on said poppet for sealing against the male conical seating surface.

2. A valve as defined in claim 1 wherein said valve body comprises a rectangular parallelopiped; said first and second bores each include a tapped portion; said standard flare tube fitting is threaded into the tapped portion; said standard flare tube fitting is threaded into the tapped portion of said first bore; said poppet is fitted into a smooth walled continuation of said first bore; and said insert further comprises a peripheral lip portion having a female conical seating surface slightly raised from the conical seating surface on said poppet for sealing against the male conical seating surface.

3. In combination with a standard flare union having an intermediate tool receiving portion, a first end portion externally threaded and terminating in a male conical end, a second end portion on the other side of the intermediate portion adapted for connection to other apparatus, and an axially extending fluid passage therethrough, said passage intersecting said conical end to form a circular end portion;
   a valve arrangement comprising:
   a valve body having a first internally threaded aperture receiving the first threaded end portion of the standard flare union, and a second aperture intersecting said first aperture for forming an internal chamber, in the valve body, said internal chamber being in fluid communication with the conical end portion of the standard flare union;
   a valve stem movably mounted in the body in alignment with the conical end portion of the standard flare union;
   a poppet carried by the valve stem for movement between a position in said internal chamber remoted from said conical end portion and a second position in sealing engagement with said conical end portion of the standard flare union,
   said poppet including a female conical seating surface adapted to mate with and seal to the conical end portion of the standard flare union in said poppet position,
   a resiliently deformable insert in the poppet for sealing engagement with said circular edge portion in said second poppet position whereby dual sealing is obtained between the poppet and the standard union in said second poppet position; and
   said insert further comprising a peripheral lip portion having a female conical seating surface slightly raised from the conical seating on said poppet for sealing against the male conical seating surface.

4. A stock valve comprising:
   a wrought valve body;
   a first cylindrical bore through said valve body including a first tapped end portion;
   a second cylindrical bore through said valve body transverse to and intersecting said first bore for defining an internal cavity in said valve body, said second bore having second and third tapped end portions for receiving standard tube fittings;
   a standard flare union having a threaded end portion engaging said first tapped end portion, a male conical seating surface in said first bore, a fluid passage through said union and intersecting said male conical seating surface to form a circular end portion; an intermediate tool receiving portion, and a threaded end portion external to said valve body for connection to an external fluid conduit;
   a fluid seal between the tool receiving portion of said standard flare union and said valve body;
   a valve stem threadably fitted in said first bore in alignment with said standard flare union;
   a poppet carried by said valve stem for movement between an open position in said first bore and out of said second bore and a closed position in sealing engagement with the conical seating surface of the standard flare union, said poppet including a truncated female conical seating surface adapted to mate with and seal against the male conical seating surface of the standard flare union in the closed position;

a resiliently deformable insert in said poppet at the truncated end of the female conical seating surface and having a surface portion adapted for sealing engagement with the circular edge portion of said standard flare union in the closed poppet position, and a peripheral lip portion having a female conical seating surface slightly raised from the truncated conical seating surface on said poppet for sealing against the male conical seating surface on said standard flare union.

PO-1050
(5/69)

UNITED STATES PATENT OFFICE
CERTIFICATE OF CORRECTION

Patent No. 3,583,441      Dated June 8, 1971

Inventor(s) Leo E. Grant and Benjamin T. Howland

It is certified that error appears in the above-identified patent and that said Letters Patent are hereby corrected as shown below:

COLUMN 2:

In line 5, "chamber" should be --chamfer--.

In line 24, following "plug 27" and before "is threaded" insert the following:

--is provided in the counterbore 15 and a valve stem 28--

Signed and sealed this 2nd day of November 1971.

(SEAL)
Attest:

EDWARD M. FLETCHER, JR.         ROBERT GOTTSCHALK
Attesting Officer                Acting Commissioner of Patents